UNITED STATES PATENT OFFICE.

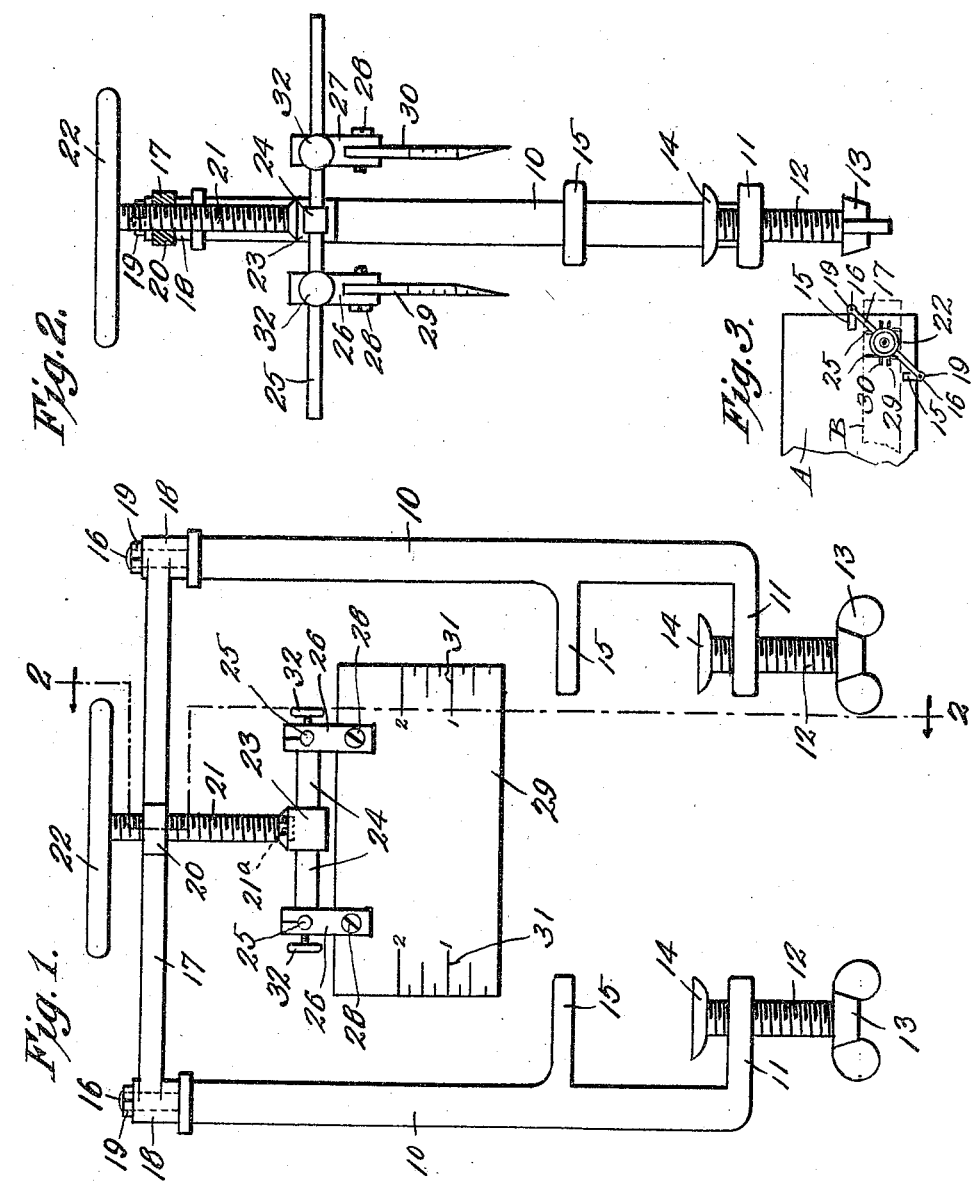

LAWRENCE H. LAIRD, OF YREKA, CALIFORNIA.

MORTISE-CUTTING TOOL.

1,297,577. Specification of Letters Patent. Patented Mar. 18, 1919.

Application filed June 1, 1918. Serial No. 237,807.

*To all whom it may concern:*

Be it known that I, LAWRENCE H. LAIRD, a citizen of the United States, residing at Yreka, in the county of Siskiyou and State of California, have invented certain new and useful Improvements in Mortise-Cutting Tools, of which the following is a specification.

This invention relates to a mortise cutting tool and has for its object to provide a simple, convenient and portable tool designed to be detachably mounted upon the strip of wood in which it is desired to cut a mortise and after being properly placed to manually operate a power device for forcing a pair of parallel chisels into the wood to cut the opposite longitudinal side of the mortise to the proper depth in a rapid and accurate manner and thus doing away with the necessity and trouble of first boring holes in the wood and afterward trimming out the same to proper size.

With these objects in view, together with others which will appear as the description proceeds, the invention resides in the novel formation, combination and arrangement of parts, all as will be described more fully hereinafter, particularly pointed out in the claims, and illustrated in the drawings, in which, Figure 1 is an elevation of the improved mortise cutting tool.

Fig. 2 is a vertical sectional view on the line 2—2 of Fig. 1, and

Fig. 3 is a diagrammatic view in plan showing the tool attached to a work bench in position for use.

In the drawings, 10 indicates two posts on the lower end of each of which is a finger 11 extending at a right angle to said post through which is formed a threaded opening to receive a pressure screw 12 carrying a manually operable head 13 on one end and a foot piece 14 on the opposite end to bear against the strip upon which the tool is mounted. Above each of the fingers 11 is a finger 15 parallel to the finger 11 and spaced therefrom and designed to bear against the opposite side of the material, the parts thus described forming a clamp for each post 10.

At the opposite end of each post is a stud 16 on which studs are pivoted the opposite ends of a connecting bar 17, these ends being provided each with a sleeve 18 for the passage therethrough of one of the studs 16. The bar is held in place on the studs by nuts 19 which, while preventing the disengagement of the bar and posts, permits easy rotation of the studs within the sleeves.

The center of the bar 17 is made with an enlargement 20 through which is formed a threaded opening for a screw stem 21, on the outer end of which is fixed a hand wheel 22 or other means for rotating the stem 21. The opposite end of the screw stem is swiveled at 21ª in a block 23 from opposite sides of which project arms 24 perpendicular to the screw stem. Rigidly mounted in the outer end of each arm 24 is a rod 25 secured at its center to said arm and extending perpendicularly thereto from opposite sides of the arm and in the plane of the arm. On each rod 25 is slidably mounted a clamp 26, these clamps being on the rods 25 that project from corresponding sides of the arms 24. Similar clamps 27 are slidably mounted on the portions of the rods 25 projecting from the opposite side of the arms. Removably mounted in the clamps 26 by means of screws 28 is a chisel 29. A chisel 30 is similarly carried in the clamp 27. The chisels 29 and 30 are furnished in sets of two of different widths and lengths to accommodate the tool for cutting mortises of various lengths and depths. As a depth guide to the user, each blade has an inch scale on the outer side at the opposite end thereof as shown at 31, which scales may, if desired, be marked on the end of the blade as shown in Fig. 2. The blades fit into notches in the ends of their clamps and are secured therein as shown by the screws or bolts 28 passing through the clamp and blades.

For adjusting the blades 29 and 30, which it is to be understood lie parallel to each other, the clamps 26 and 27 are slidable on the rods 25, but may be temporarily secured immovable on said rods by thumb screws 32 threaded in the clamps and adapted to bear upon the rods.

In using this tool it is possible to secure it to one end of a work bench A in angular position as in Fig. 3, one clamp being fastened to the end of the bench and the other to an adjacent side. After the width and position of the mortise has been properly marked on a strip of wood B, blades of proper size are mounted in the clamps 26 and 27 and the latter adjusted to set said blades to the width of the mortise by sliding them on the rods 25 and when properly positioned, they are clamped to said rods by the thumb screws 32. The marked strip of wood is then placed under the tool, supported on the bench A, and the screw stem 21 turned by means of the hand wheel 22 to force the chisels into the wood to the desired depth as determined by the scales 31 on the blades. Upon completion of the cut, the chisels are withdrawn by reversing the screw stem and the strip B removed from beneath the tool. If desired, the strip B may be clamped to the bench, but this is not necessary. The ends of the mortise are then cut in the usual manner by a hand chisel and the material between the cuts removed.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:

1. A mortise cutting tool comprising a pair of upright posts having independent clamping devices at the lower end and studs rising from the upper end, a connecting bar pivotally mounted on said studs, a screw stem threaded through the connecting bar and having a hand wheel at its upper end and a head at its lower end, a pair of chisels carried by said head, and means for adjusting them toward and from each other.

2. A mortise cutting tool comprising a pair of posts, a clamping device on one end of each post, a connecting bar pivotally connected to the opposite ends of said posts, a screw stem threaded in said connecting bar and having a manually operable means on one end, a head swiveled to the opposite end of said screw stem, two rods carried by said head in parallel relation, clamps adjustable on said rods, and a pair of chisels carried by said clamps in parallel arrangement and adjustable to and from each other.

In testimony whereof I affix my signature in presence of two witnesses.

LAWRENCE H. LAIRD.

Witnesses:
B. K. COLLIER,
R. C. COLLIER.

Copies of this patent may be obtained for five cents each, by addressing the "Commissioner of Patents, Washington, D. C."